Figure 1:
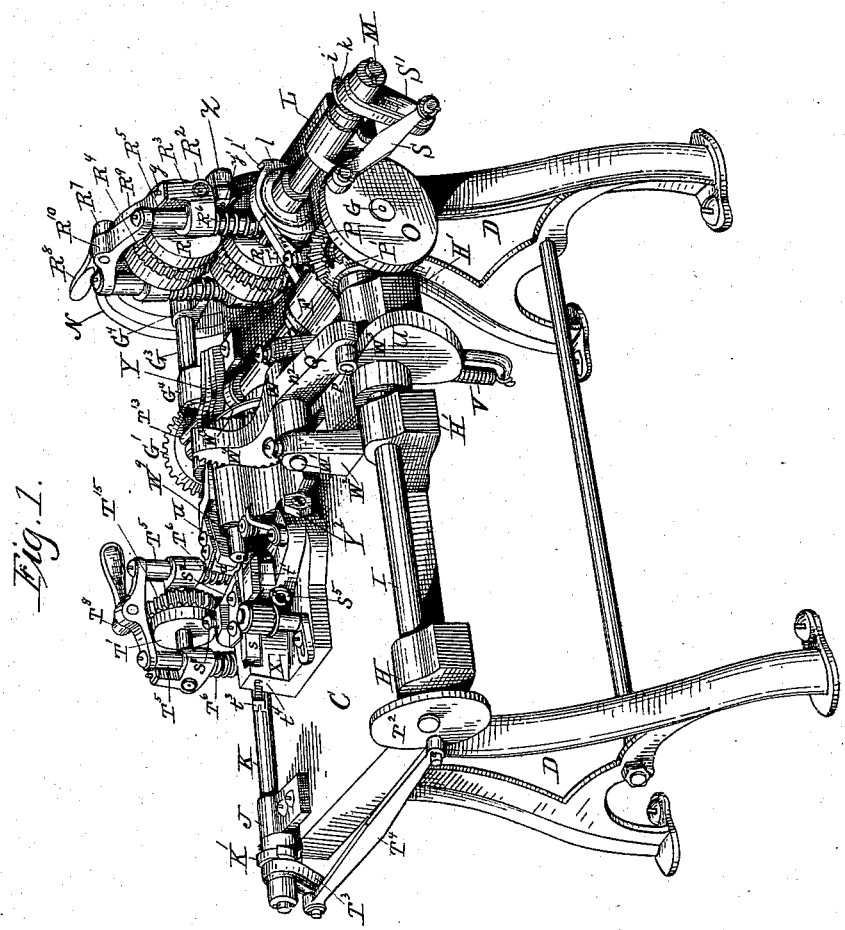

(No Model.)  6 Sheets—Sheet 1.

D. C. STOVER.
MACHINE FOR MANUFACTURING BARBED FENCE WIRE.

No. 278,624. Patented May 29, 1883.

Witnesses;
John C. Dewey
Thos. H. Dodge

Inventor;
Daniel C. Stover

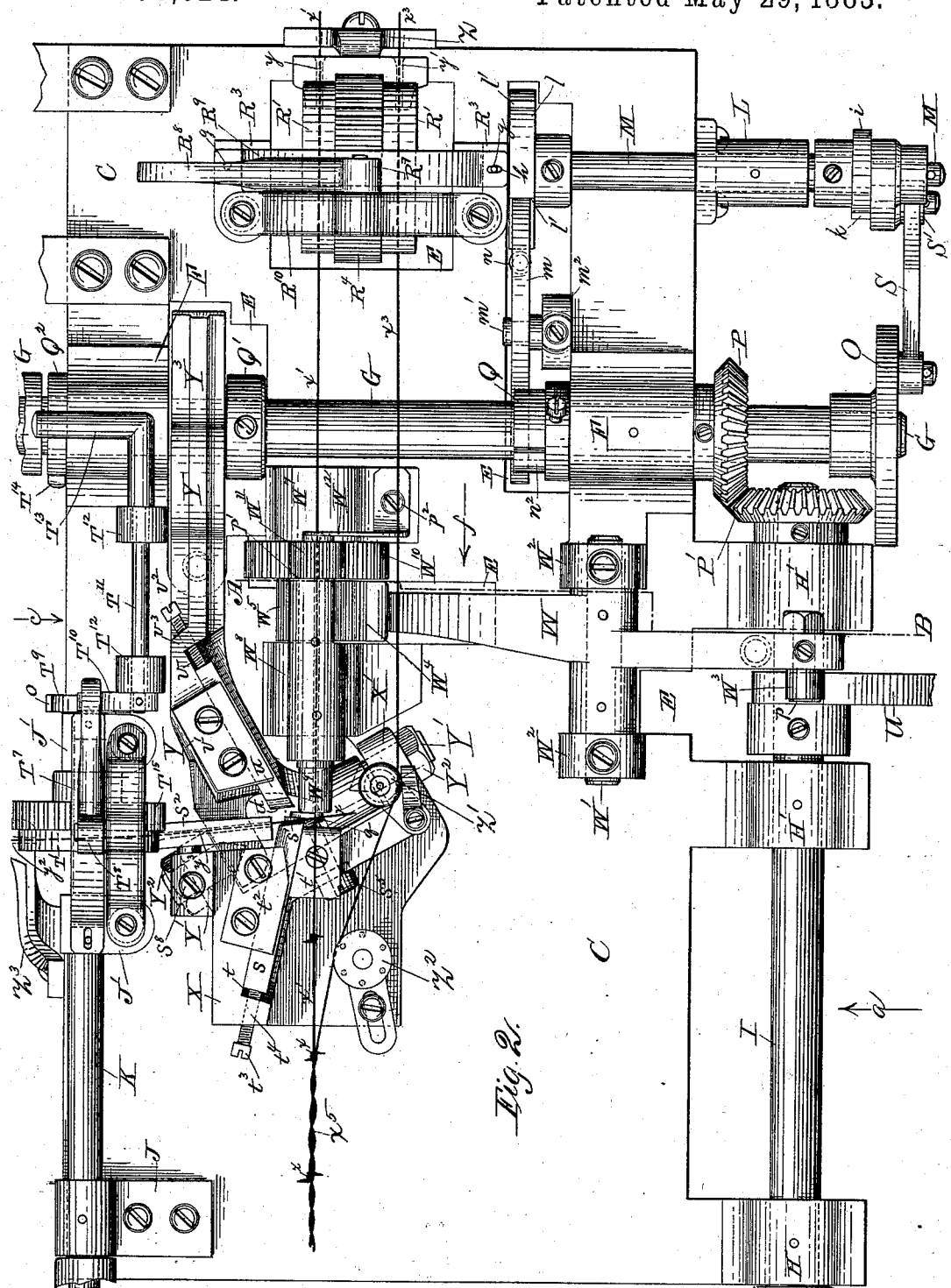

(No Model.) 6 Sheets—Sheet 3.
D. C. STOVER.
MACHINE FOR MANUFACTURING BARBED FENCE WIRE.
No. 278,624. Patented May 29, 1883.
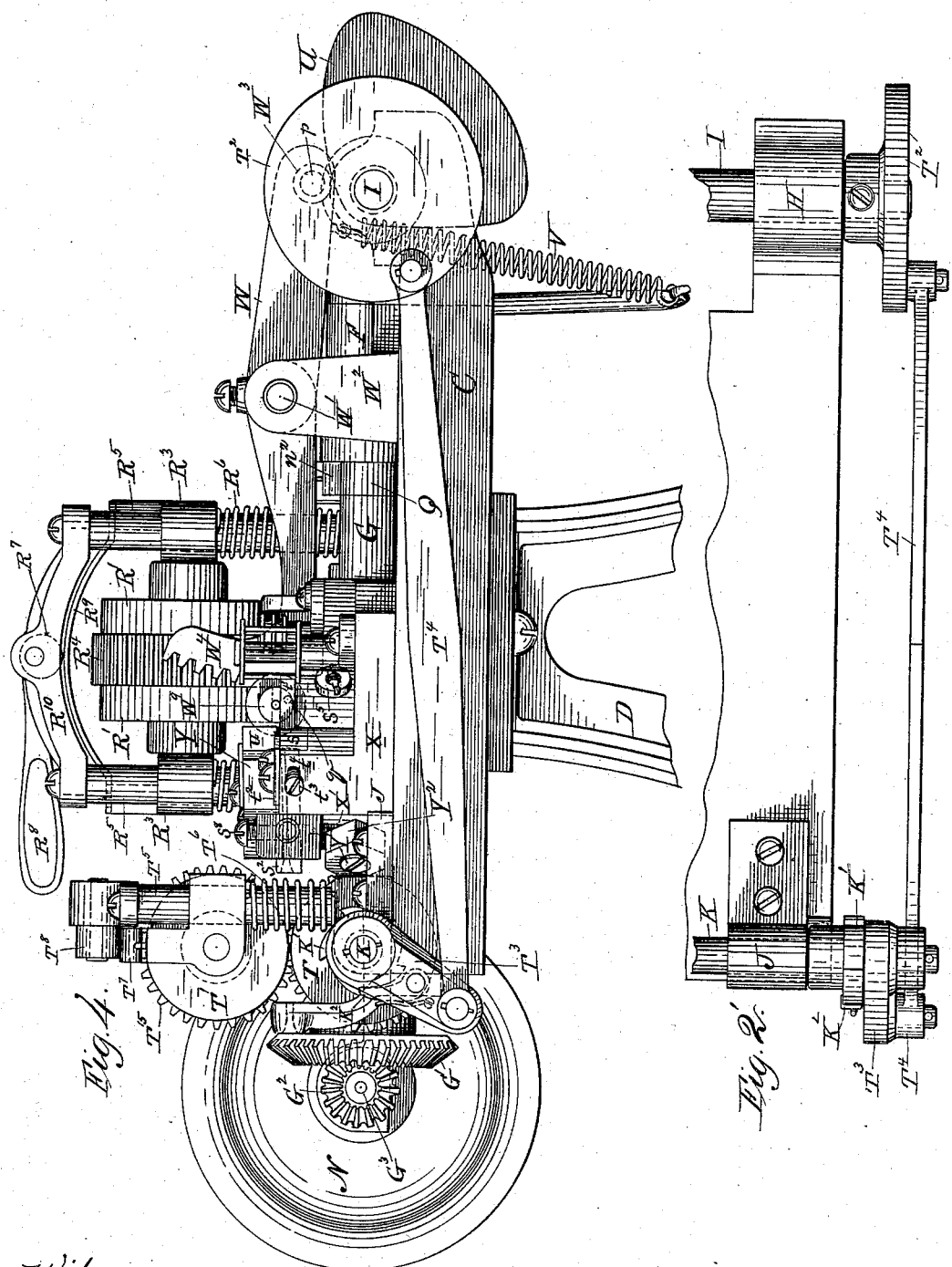
Witnesses:
John C. Dewey
Thos. H. Dodge
Inventor:
Daniel C. Stover

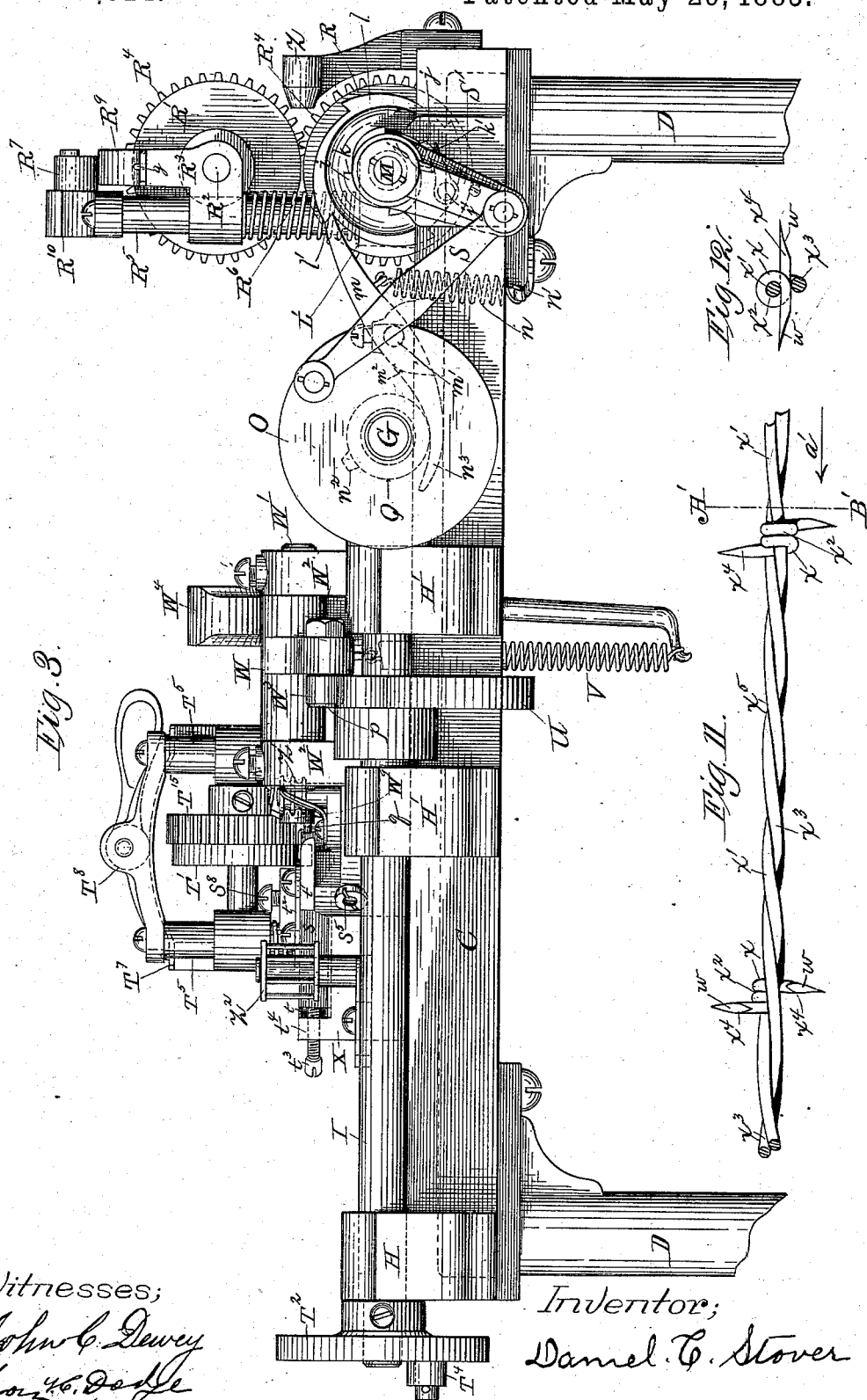

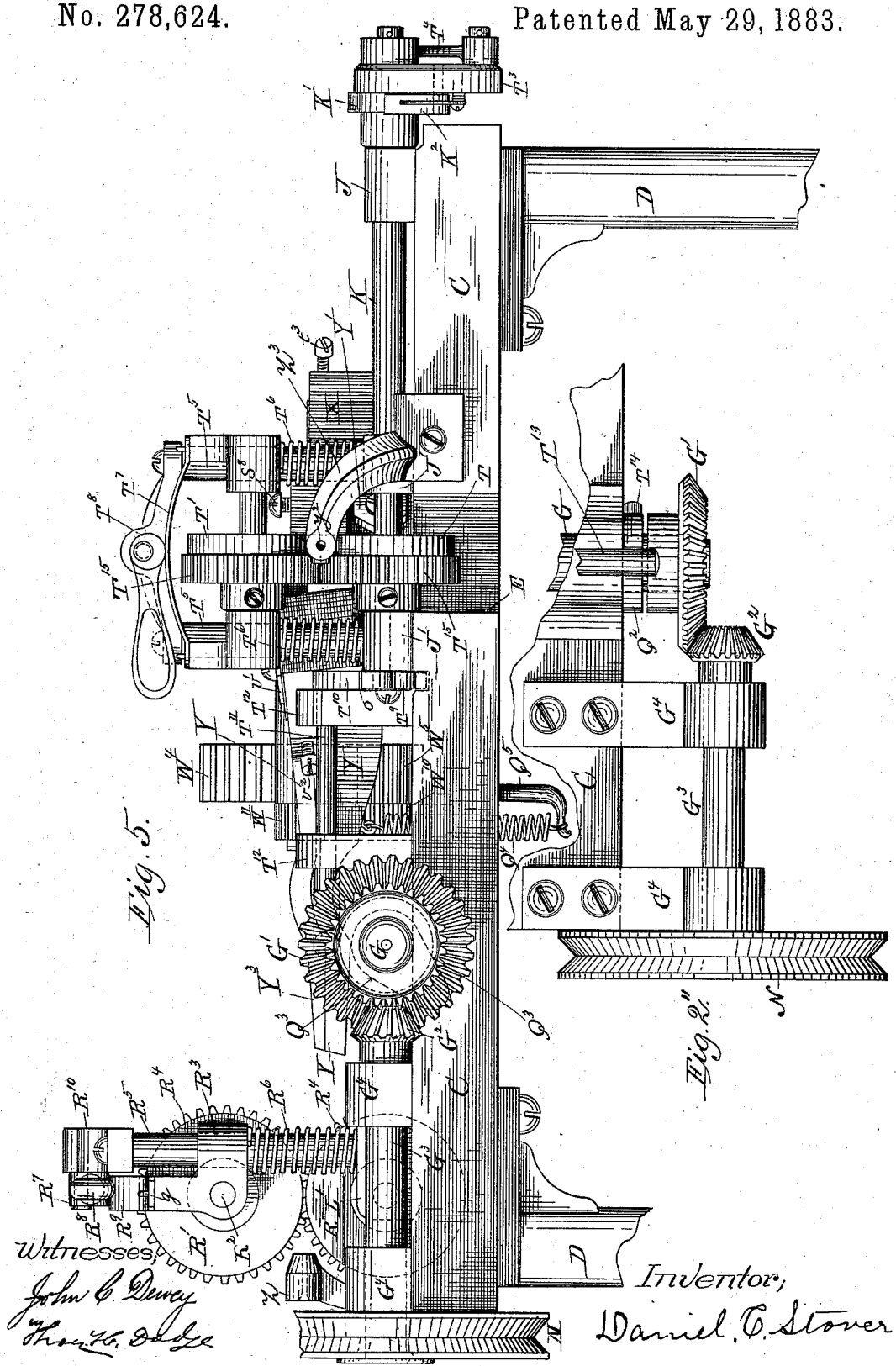

(No Model.) 6 Sheets—Sheet 6.
D. C. STOVER.
MACHINE FOR MANUFACTURING BARBED FENCE WIRE.
No. 278,624. Patented May 29, 1883.
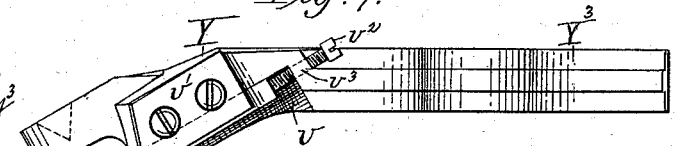
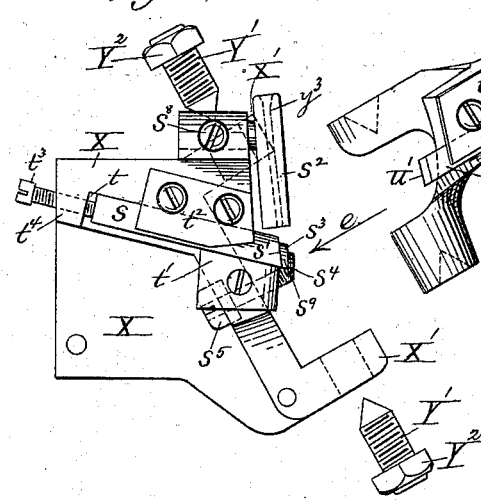
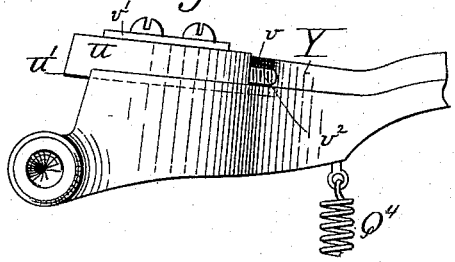
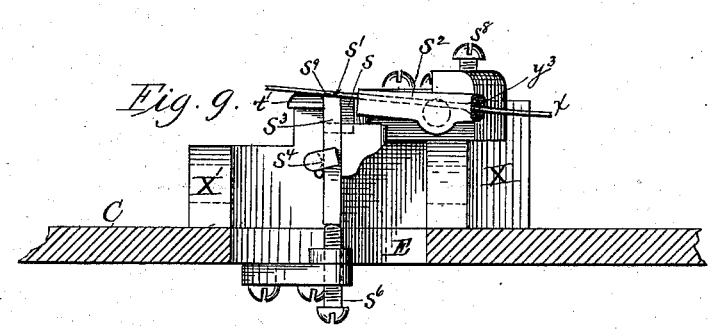
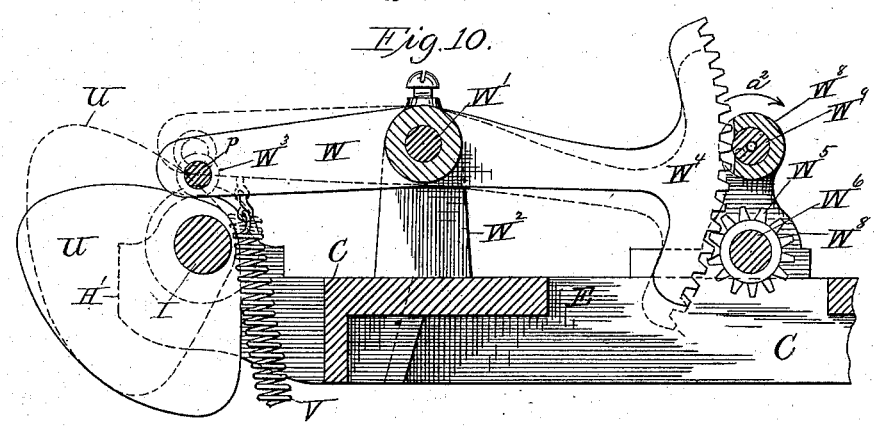
Witnesses:
John C. Dewey
Thos. H. Dodge
Inventor:
Daniel C. Stover

UNITED STATES PATENT OFFICE.

DANIEL C. STOVER, OF FREEPORT, ASSIGNOR TO I. L. ELLWOOD & CO., OF DE KALB, ILLINOIS.

MACHINE FOR MANUFACTURING BARBED FENCE-WIRE.

SPECIFICATION forming part of Letters Patent No. 278,624, dated May 29, 1883.

Application filed March 2, 1883. (No model.)

*To all whom it may concern:*

Be it known that I, DANIEL C. STOVER, of Freeport, Stephenson county, State of Illinois, have invented certain new and useful improvements in machines for manufacturing barbed fence-wire by a continuous and automatic operation; and I do hereby declare that the following is a full, clear, and exact description of the same, reference being had to the accompanying drawings, forming a part of this specification, and in which—

Figure 1 represents a perspective view of a barb-fence machine embracing my aforesaid improvements. All of the succeeding figures are represented upon the same and an enlarged scale from that shown in Fig. 1, except Figs. 11 and 12, which are shown full size. Fig. 2 represents a top or plan view of the barb-fence machine shown in Fig. 1, with some of the less important parts broken off and shown in Figs. 2' 2'', for the purpose of more clearly illustrating my improvements. Fig. 3 represents a side view of the machine, looking in the direction indicated by arrow $a$, Fig. 2. Fig. 4 represents an end view of the machine, looking in the direction of arrow $b$, Fig. 2. Fig. 5 represents an opposite side view from that shown in Fig. 3, looking in the direction of arrow $c$, Fig. 2. Figs. 6, 7, and 8 represent detached views of the barb-cutting parts of the machine, which will be hereinafter more fully described. Fig. 9 represents a vertical section through a portion of the bed-plate of the machine, showing a side view of the parts shown in Fig. 6, looking in the direction of arrow $e$, same figure. Fig. 10 represents a vertical cross-section of the machine, taken on line A B, Fig. 2, looking in the direction indicated by arrow $f$, same figure; and Figs. 11 and 12 represent a plan view and section, respectively, of a section of barbed fence-wire such as is manufactured by this machine, Fig. 12 being a cross-section on line A' B', looking in the direction of arrow $a'$ of said Fig. 11.

My invention relates to barb-fence machines for manufacturing two-pointed, double-strand, and twisted barb fence-wire; and it consists in the combination of mechanism hereinafter described for producing finished barbed fence-wire having short barbs by a continuous and automatic operation.

To enable those skilled in the art to which my invention belongs to make and use the same, I will proceed to describe it more in detail.

In the drawings, C represents the bed-plate of the machine, which is supported at each end on suitable frames or legs, D, and cut away at the points E to receive portions of the machine extending below the top surface.

Upon the bed C are formed or secured the bearings F F for the main driving-shaft G to turn in, the bearings H H' H' for the shaft I, the bearings J J' J' for the shaft K, and the bearings L L' L' for the shaft M.

To one end of the main driving-shaft G is secured a bevel-gear, G', which engages with a smaller bevel-gear, G², secured to the end of shaft G³, which turns in the stationary bearings G⁴ G⁴. To the other end of said shaft G³ is secured the driving-pulley N, which may be connected by a belt with any suitable and convenient driving mechanism. Upon the other end of the main driving-shaft G is secured a circular disk, O, and between the latter and bevel-gear G' a bevel-gear, P, collars Q Q' Q², and cam Q³, the latter being shown by dotted lines in Fig. 5.

Driving-power is imparted from shaft G to turn shaft M (upon which the lower main wire feed-rolls, R R, are arranged and secured) by means of a link or pitman, S, secured at one end to a crank-pin on the outer side of the circular disk O, and at its other end to the outer end of a crank-arm, S', which is loosely connected at its other end to the end of said shaft M.

The shaft R² of the upper feed-rolls, R' R', is arranged to turn in vertically-sliding bearings R³ R³, and said rolls are operated by the lower ones by means of spur-gears R⁴ R⁴, secured upon the shafts M and R², between each set of feed-rolls, as shown in the drawings. The sliding bearings R³ are fitted to slide up and down on circular standards R⁵ R⁵, and a constant upward pressure is produced upon them, so as to raise the upper feed-rolls off of the lower ones, when required, by means of spiral springs R⁶ R⁶, arranged around the standards R⁵, between said bearings R³ and bearings L'. The upper feed-rolls, R', are forced down, so as to produce a pressure upon the main wires to feed the latter forward by turning eccentric $R^7$ by means of handle $R^8$, so as to bear down on the top of bow-shaped spring $R^9$, arranged on top of the bearings $R^3$ of said feed-rolls $R R'$. The spring $R^9$ is in this instance held in position upon the bearings $R^3$ by means of pins $g\ g$, and is made with a slot, $h$, at one end to admit of the upper feed-roll being sprung up sufficient to allow bunches or other imperfections on the wires to pass between the rolls without injury to the same. The feed-rolls $R\ R'$ are given an intermittent rotary motion, so as to feed the main wires forward at intervals when required, as hereinafter described, by means of a ratchet-wheel, $i$, and pawl $j$, the pawl $j$ being hinged to the crank-lever $S'$ at $j'$ and held against the ratchet-wheel, so that it will catch against the notches $k$ by means of a spring, $k'$. By this arrangement it will be seen that when the lever S is moved forward by the rotation of disk O the pawl is forced up and turns the ratchet-wheel and shaft M, and consequently the feed-rolls, to feed the main wires forward. The eccentric $R^7$ is pivoted at the center to cross-frame piece $R^{10}$, which is fastened at each end to the tops of standards $R^5 R^5$.

In practice the several parts are so constructed and arranged in relation to each other as to turn the feed-rolls a sufficient distance to feed the main wires forward the distance required for the barbs to be secured apart upon the same which in practice is usually about four inches.

In order that the feed-rolls $R\ R'$ may be prevented from turning too far after feeding the main wires forward, and thereby disarranging their driving mechanism, a ratchet-wheel, $l$, is arranged and secured upon shaft M, next to one of the bearings $L'$, and a pawl or dog, $m$, (pivoted at $m'$ to a stationary standard, $m^2$,) is arranged to catch against one of the notches, $l'$, of said ratchet-wheel just as the pawl $j$ recedes from its notch $k$ on the ratchet-wheel $i$. Were such a provision not made, the tension produced upon the two main wires by the twisting operation, hereinafter referred to, would tend to move the rolls and their operating parts so far forward as to cramp or retard the proper action of the same.

The pawl $m$ is held down so as to catch against the notches $l'$ of the ratchet-wheel $l$ by means of a spiral spring, $n$, fastened at one end to the under side of said pawl $m$ and at the other end to a stationary part, $n'$, and is raised at the proper time to allow the notches to pass by the end of the pawl $m$ by a cog or tooth, $n^2$, formed upon collar Q, (see dotted lines, Fig. 3,) striking the rear curved end, $n^3$, of said pawl $m$ as the shaft G revolves.

The several parts are so constructed and arranged in relation to each other as to feed the main wires forward the distance between one barb and the next succeeding one at each revolution of the main driving-shaft G. Driving-power is imparted from said main driving-shaft to turn shaft I by means of the bevel-gear P, which engages with a similar bevel-gear, $P'$, upon the end of said shaft I.

The barb-wire feed-rolls $T\ T'$ and their actuating mechanism are similarly constructed and arranged in relation to said shaft I as the main wire feed-rolls are to the main driving-shaft G, a circular disk, $T^2$, (see Figs. 2, 2', and 4,) being secured to the outer end of the shaft I, which is connected to a crank, $T^3$, on the outer end of the shaft K (upon which the lower barb-wire feed-roll is secured) by means of a long pitman or connecting-rod, $T^4$, the shaft of the upper feed-roll, $T'$, being also fitted to slide up and down on vertical standards $T^5 T^5$, said rolls given a springing movement by means of spiral springs $T^6 T^6$, bow-spring $T^7$, and eccentric $T^8$, and are operated by the lower roll, T, by means of spur-gears $T^{15}\cdot T^{15}$. Said feed-rolls are also given an intermittent forward rotary motion, the same as the main wire feed-rolls, by means of a ratchet-wheel, $K'$ and pawl $K^2$.

A similar device to that before described for governing the turning of the main wire feed-rolls is also provided for the barb-wire rolls $T\ T'$ to prevent the tension upon the wire (caused by coiling the barb-wire around the main strand to form the barbs, as hereinafter described) from turning said rolls too far forward for the reason before stated. In this instance a ratchet-wheel, $T^9$, is fastened upon the inner end of the shaft K, against the side of the inner bearing, $J'$, and its pawl $T^{10}$ is fastened upon the end of a shaft, $T^{11}$, which is fitted to turn in stationary bearings $T^{12} T^{12}$, and provided with the enlarged end $T^{13}$, extending at right angles to the same, over the collar $Q^2$ upon shaft G, which is provided with a cog or tooth, $T^{14}$, for raising the pawl of the ratchet-wheel at each revolution of said shaft G above and out of action with the notches $o$ when required. The weight of the enlarged end $T^{13}$ is sufficient in this instance to hold the pawl against the face of the ratchet-wheel without the use of a spring.

The mechanism for coiling the barb-wire $x$ around the main wire $x'$ (see Figs. 2, 11, and 12) is constructed and arranged to operate in the following manner: A cam, U, (see Figs. 2, 3, 4, and 10,) is arranged and secured upon shaft I, between bearings $H' H'$, which, in combination with a spiral spring, V, operates a rocking segment-gear part, W, (fulcrumed upon a journal, $W'$, arranged in the tops of standards $W^2 W^2$,) a friction-roll, $W^3$, being fitted to turn on a stud, $p$, in the outer end of the rocking part W, over the cam, against which said cam bears when rotated, thus imparting its action to the rocking part, as above described. The inner end of said rocking part W is provided with a segment spur-gear, $W^4$, which engages with a pinion, $W^5$, secured upon a journal, $W^6$, fitted to turn in the stationary bearings $W^7 W^8$. The bearing $W^8$ is extended up to form a long bearing for the barb coiling or wrapping spindle $W^9$, and said spindle is operated by the rocking part W, through the aforesaid segment-gear $W^4$, pinion $W^5$, spur-gear $W^{10}$, (secured upon the same journal as pinion $W^5$,) and pinion $W^{11}$, formed upon or secured to the end of spindle $W^9$. Said spindle $W^9$ is fitted loosely in its bearing longitudinally, being prevented from moving in the direction from the pinion $W^{11}$ by said pinion bearing against the side $p'$ of bearing $W^8$, and in the opposite direction by a spring, $W^{12}$, secured at $p^2$ to the bearing $W^7$. This arrangement admits of the spindle being sprung backward slightly, as required, by the barb-coiling operation hereinafter described, which is a very essential feature, as will be seen, to properly coil the barb-wire around the main wire.

In coiling the barb-wire $x$ around the main wire $x'$ it is first fed forward under said main wire and over the turning-finger $q$ of the wrapping spindle $W^9$, when said spindle $W^9$ is then turned in the direction of the barb-wire feed-rolls T T', as shown by arrow $a^2$, Fig. 10, by raising the outer end of the rocking part W, as before described, and thereby coiling or wrapping the barb-wire around the main wire, as represented at $x^2$, Figs. 11 and 12 of the drawings.

The cam U is made of the proper shape to turn the spindle $W^9$, so as to form two coils, as shown, about the main wire $x'$, and to afterward reverse or turn back said spindle into its original position, as shown in Figs. 2, 3, and 4 of the drawings, at each revolution of cam U, which is turned with the same speed as the main driving-shaft G.

As the barb-wire $x$ is coiled around the main wire $x'$ toward the wrapping-spindle $W^9$, it bears against and forces said spindle and its spring $W^{12}$ back, thus producing quite a pressure upon the coil as it is formed, which insures a compact and perfect finished coil.

The cam U is so formed, as will be seen by Figs. 4 and 10, that the spiral spring V causes the wrapping-spindle to very quickly recede or turn back into its original position after forming the coils, as before described.

After the barb-wire $x$ has been coiled about the main wire $x'$, as before described, said wire is cut off upon an angle close up to said main wire to form the barbs $x^4$ in the following manner:

A stationary cutter, $s$, is arranged in the top of an angular stationary block, X, said block being cut out, as shown at $t$, to receive it. Said cutter $s$ is held in place by the side plate, $t'$, and top plate, $t^2$, and may be adjusted longitudinally by means of the set-screw $t^3$, which may be turned forward or back in the part $t^4$ of block X, sufficient space being allowed between the end of the cutter and the part $t^4$ to admit of the aforesaid adjustment. The inner end of cutter $s$ is made upon an angle laterally, and its upper edge, $s'$, is made a sharp cutting-edge. (See Figs. 2, 6, and 9.)

The movable cutter $u$ is arranged and fastened in the top of the angular rocking part Y, which is pivoted obliquely to the line of the main wire, and also to the line of the barb-wire, at its inner end, upon pointed screw-studs Y' Y', that are fitted to turn in and out in the parts X' X' of stationary block X. By this arrangement it will be seen that the movable cutter $u$ may be adjusted laterally to the stationary cutter $s$ by simply turning set-nuts $Y^2$ $Y^2$ and moving the pivot-screws Y' Y' as required.

The movable cutter supporting and rocking part Y is pivoted at its forked end or head obliquely to the spindle $W^9$ and to the line of the fence-wire, so that when its outer end is raised the movable cutter $u$ is moved forward and laterally by the end of the spindle $W^9$ and toward the main fence-wire, so as to cut off the barb-wire close up to the main wire. The axis upon which the support for the movable cutter turns is oblique to the axis of the barb-wire feed-rolls, so that the said cutter moves obliquely across the barb-wire, and, in virtue of the obliquity, has a shear or drawing cut on the wire.

New portions of the cutting-edge will successively come into action, the motion of the movable cutter being the resultant of two motions—one parallel with the cutting-edge and one perpendicular thereto—of which motions the former has the effect of bringing successively new portions of the cutting-edge into operation, while the latter carries the cutter across the wire.

The rocking part Y is cut out at $v$ to receive the movable cutter $u$, and said cutter is held in place by a top plate, $v'$. It may be adjusted longitudinally by means of an adjusting-screw, $v^2$, which may be turned forward or back in the part $v^3$ of said rocking part Y.

The inner end of the movable cutter $u$ is made upon an angle, as shown in Figs. 2, 7, and 8, so as to form a sharp cutting-edge, $u'$, upon its under side, and the rocking part Y is so operated by means of the cam $Q^3$ (see dotted lines, Fig. 5) as to cause the movable cutting-edge $u'$ to be moved forward by and in close contact with the stationary cutting-edge $s'$ to cut off the barb-wire, as hereinafter described. The cam $Q^3$ is secured upon the main driving-shaft G, directly under the rear end, $Y^3$, of the rocking part Y, and said part Y is pivoted at a considerable distance below the level of the stationary cutter $s$, so as to admit of the aforesaid forward movement of the movable cutter $u$.

It will be observed by Figs. 2 and 6 that the stationary cutting-edge $s'$ is arranged about in the vertical plane through the centers of the pivotal bearings of the rocking part, thereby insuring perfect action of the cutters.

The rear end, $Y^3$, of the rocking part Y is kept in contact with the cam $Q^3$, so that the action of the latter may be imparted to said rocking part by means of a spiral spring, $Q^4$, secured at one end to the under side of said part Y and at its other end to a stationary part, $Q^5$. (See Fig. 5.)

In order that the barb-wire $x$ may be cut off upon an acute angle, as shown at $w$, Figs. 11 and 12, the barb-wire feed-rolls T T' are arranged so as to bring the space between them (where the wire passes through) at a short distance below the level of the stationary cutting-edge $s'$ and the guide $s^2$ (which guides the wire from between the feed-rolls to the cutters) upon an angle.

The guide $s^2$ may be adjusted in its supporting-bearing to different angles by means of set-screw $s^8$.

The adjustable barb-wire rest $s^3$, just in front of the stationary cutter $s'$, is also made with an inclined top surface, $s^9$. (See Fig. 9.) Therefore when the barb-wire is fed forward over said rest $s^3$ it lies at an angle to the stationary cutter $s'$, as is also shown in Fig. 9, so that when the movable cutting-edge $w'$ is passed by it the wire is cut apart upon an angle, as before stated.

The angle of the cut $w$ may be varied as desired by changing the angle at which the wire is fed forward and the angles of the cutters.

The barb-wire rest $s^3$ is held in position by the holding part $s^4$, which is formed or fastened on the inner end of a screw, $s^5$. Therefore it may be unfastened or fastened in adjusting the rest, as required. It may be adjusted vertically by means of an adjusting-screw, $s^6$, upon which its lower end rests. The angle of the top surface, $s^9$, may be varied as required.

It will be seen that by this construction and arrangement the barb-wire $x$ may be cut close up to the coil $x^2$ upon the main wire $x'$, thereby admitting of the barbs being made considerably shorter than by the use of similar machines now in use, which is an important feature, inasmuch as it enables quite a saving in material, and therefore expense, in the manufacture of such fencing, while at the same time the utility of the fencing is improved, rather than impaired, by thus shortening the barbs, as they are less liable to be bent than the longer ones by stock rubbing against or coming in contact with the same.

The several parts of the machine are represented in the drawings in the positions that they occupy just after the barb-wire $x$ has been fed forward under the main wire $x'$, and prior to being coiled or wrapped about the same, as before described, by the turning-finger $q$.

The operation of the machine may be briefly summed up thus: The main wires $x'$ and $x^3$ are first uncoiled from suitable reels or spools arranged at a convenient distance from the machine, then passed through the machine by hand and their ends fastened to one of the arms of the spool of the twister, which is not shown in the drawings, the same not constituting a part of this invention. The wire $x'$, after having been passed through the opening $y$ of the guide Z and between its set of feed-rolls R R', is then passed through a longitudinal opening formed in pinion $W^{11}$ and wrapping-spindle $W^9$, and thence over plate $t'$ and other parts to the twisting-machine, as aforesaid. The wire $x^3$, after having been passed through the opening Y' in the guide Z and between the feed-rolls R R', is drawn forward over the rocking part W, thence outside of the guide Z' in front of the guide $Z^2$, as shown in Fig. 2, and forward to the twister, as aforesaid. The barb-wire is first passed through the opening $y^2$ of the guide $Z^3$ and between the feed-rolls T T', thence through the opening $y^3$ in the inclined guide $s^2$, over the supporting part $s^3$, under the main wire $x'$, and over the barb coiling or wrapping finger $q$, where it is left. The machine is now turned by hand and the first barb put on to get the machine in good running condition, when the power is then applied, and the main wires $x'$ $x^3$ are fed forward by the rolls R R' to where the next barb is to be put on, and there stopped to allow the barb-wire $x$ to be fed forward by the rolls T T', said barb-wire coiled about the main wire $x'$ and cut off to form the barbs, in the manner before described, by a continuous and automatic operation. The main wires are then again fed forward and the aforesaid operation repeated. As fast as the barbs are fastened upon the main wire $x'$ and said wire $x'$ and wire $x^3$ are fed forward they are intertwisted to form one double strand, as represented at $x^5$, Figs. 2, 11, and 12 of the drawings, by a suitable twisting-machine provided for the purpose, arranged at a short distance from and in a line with the barbing-machine, said twister also coiling the wires as fast as they are intertwisted upon a spool or reel arranged upon the same, ready for the market.

Having described my improvements in machines for manufacturing barbed fence-wire by a continuous and automatic operation, what I claim therein as new and of my invention, and desire to secure by Letters Patent, is—

1. The combination, with the main shaft, the strand-wire feed-rolls, the feed-shaft carrying the lower feed-rolls, and the crank-pin, pitman, crank-arm, pawl-and-ratchet disk for intermittently revolving the feed-shaft, of the stop mechanism, comprising the ratchet-disk fixed on the feed-shaft, the pawl pivoted between the two shafts, the spring for the pawl, and the toothed hub on the driving-shaft for acting upon the tail of the pawl to move it periodically out of engagement with the ratchet-wheel, substantially as described.

2. The combination of the main shaft, the shaft at right angles thereto, the barb-wire feed-rolls, the disk and crank-pin on said last-named shaft, the pitman, crank-arm, pawl-and-ratchet wheel for turning said feed-rolls, the stop-ratchet wheel on the shaft of the lower feed-roll, the pawl for engaging the stop-ratchet disk, and the releasing-cam on the aforesaid main shaft, substantially as described.

3. The combination, with the barb-wire feed-rolls, the barb-cutters, the wrapping-spindle, and the mechanism for operating the same to wrap the free end of the barb around the strand-wire before it is severed from the barb-wire, of the barb-wire feed-rolls, the mechanism for turning the same intermittently to feed the barb-wire, and the stop mechanism for arresting and holding stationary the feed-rolls, so that they retain the barb-wire and prevent its being drawn forward in the wrapping operation, substantially as described.

4. The combination, with bevel-gear P on shaft G, of bevel-gear P' on shaft I, cam U, friction-roll $W^3$, and rocking arm W, said cam being shaped, as explained, so as to lift the outer end of said arm slowly and to allow it to drop back rapidly, substantially as and for the purpose set forth.

5. The combination, with cam U on shaft I, friction-roll $W^3$, and rocking arm W, properly fulcrumed, and provided at its inner end with a segment-gear part, $W^4$, of pinion $W^5$, and spur-gear $W^{10}$ on journal $W^6$, and pinion $W^{11}$, secured to or formed upon the barb-wire wrapping-spindle $W^9$, which is provided with the wrapping or coiling finger $q$, said pinion $W^5$ and spur-gear $W^{10}$ being placed under the wrapping-spindle, substantially as and for the purpose set forth.

6. The combination, with the wrapping-spindle journaled in bearings and movable longitudinally therein, of a flat spring secured to the machine-frame and arranged to bear at its free end against the rear end of the spindle, substantially as described.

7. The combination, with the cam $Q^3$ on shaft G, of the movable cutter supporting and rocking arm Y, fulcrumed at its inner end upon adjustable screw-studs Y' Y' below said cutter and provided with a horizontal rear end or tail piece extending above said cam, and spring $Q^4$, substantially as and for the purpose set forth.

8. The angular rocking support for the movable cutter, the same having a seat for the cutter, a forked head for the pivot-bearings below said seat, and a rear extension or tail-piece for bearing upon the operating-cam, substantially as described.

9. In a barbed-fence machine, the combination, with the movable and stationary cutters for cutting the barb-wire, of supporting and operating mechanism for moving the first-named of said cutters obliquely across the said barb-wire, so as to give to the cutter a draw or shear cut in virtue of the obliquity of the motion, substantially as described.

10. The combination, with the barb-wire feed-rolls and stationary and movable cutters, of the rocking support for the movable cutter supported on an axis oblique to that of said feed-rolls, substantially as described.

11. In combination with the wrapping-spindle and barb-wire feeding and supporting mechanism of a barbed-fence machine, the cutters arranged in close proximity to said spindle and comprising a stationary cutter and a second cutter movable obliquely to both the main wire and barb-wire, substantially as described, for the purpose of cutting the barb-wire close to the coil on the main wire.

12. The combination, with the stationary adjustable cutter $s$, of the adjustable inclined barb-wire guide $s^2$, adjustable barb-wire rest $s^3$, and its holding part $s^4$, substantially as and for the purpose set forth.

13. In a wire-barbing machine, the combination, with the stationary and movable cutters and the barb-wire-coiling finger of the wrapping-spindle, of an adjustable barb-wire guide and adjustable rest, and the barb-wire feed-rolls, substantially as shown and described.

DANIEL C. STOVER.

Witnesses:
JOHN C. DEWEY,
ALBERT A. BARKER.